Sept. 21, 1965  J. A. HALL ETAL  3,208,073
METHOD FOR REPRODUCING A SEISMOGRAM
Filed Sept. 9, 1959
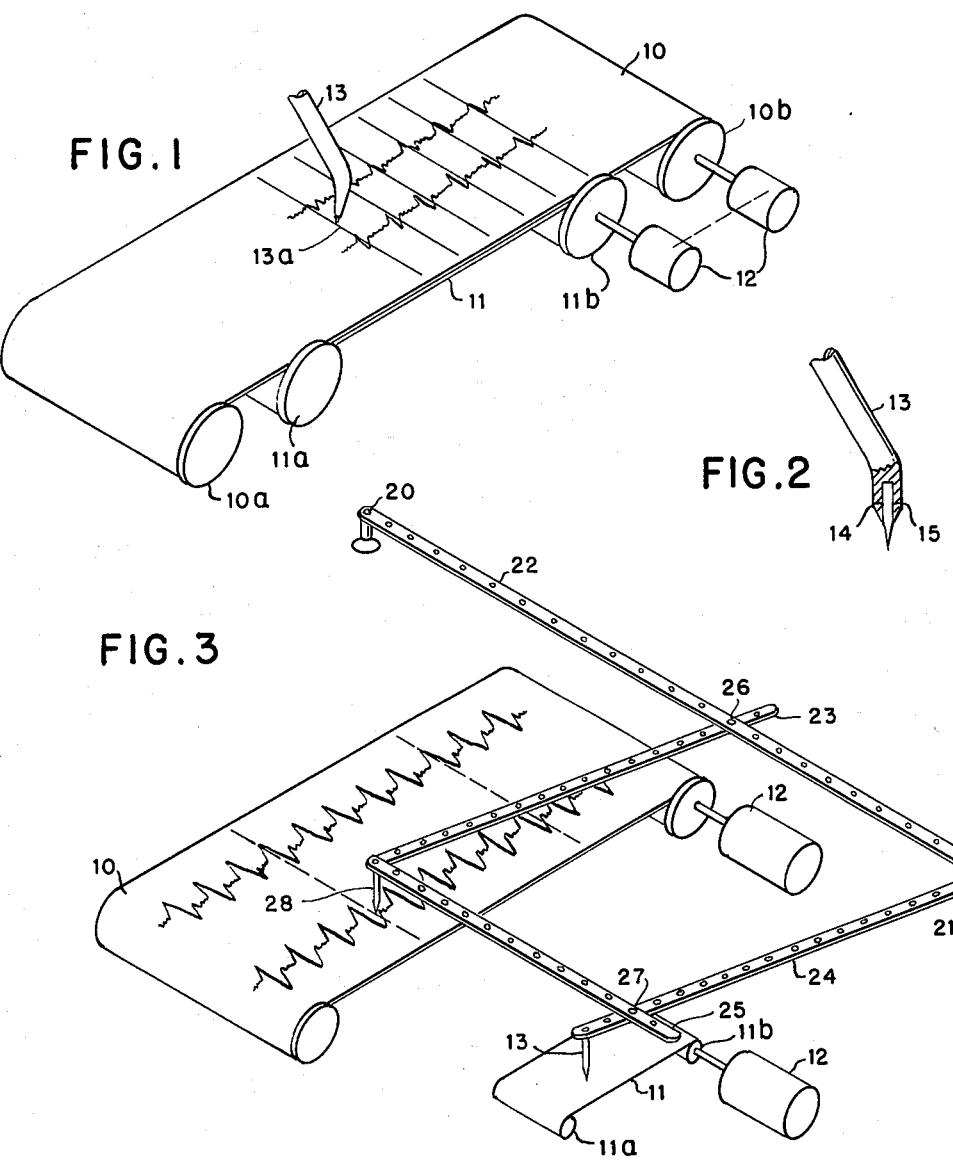
INVENTORS
J. A. HALL
ROBERT L. TUCKER
BY Adams Forward & McLean
ATTORNEYS

000# 3,208,073
METHOD FOR REPRODUCING A SEISMOGRAM

J. A. Hall, Algiers, Algeria, and Robert L. Tucker, Roswell, N. Mex., assignors, by mesne assignments, to Sinclair Research, Inc., New York, N.Y., a corporation of Delaware
Filed Sept. 9, 1959, Ser. No. 838,992
1 Claim. (Cl. 346—1)

This invention relates to geophysical exploration of the earth's subsurface by the analysis of seismic data. More particularly, it relates to a system for transferring seismic data from a visual record, e.g., a wiggle trace seismogram, to magnetic recording tape.

Information regarding subsurface geologic formations is most frequently gathered by the recordation of reflected and refracted seismic energy detected by numerous geophones spread at various distances about a point where an explosive is detonated at or near the earth's surface. For many years, the seismic waves detected by each geophone and time signals have initially been mechanically or photographically recorded in graphic form, i.e., as wiggle traces. These records are subsequently analyzed frequently by means of "picks," i.e., marks made by the analyst along the respective wiggle traces to indicate the location of a reflection or the like. One of the major problems in the analysis of such records is the difficulty in including static and dynamic correction for such factors as weathering and step-out. For this reason, seismograms are today almost universally recorded initially on magnetic tape which permits such corrections to be made electrically with ease and precision. Nevertheless, many thousands of graphically recorded (wiggle trace) seismograms made before the days of magnetic tape records are still available and contain valuable data representing many days of work by many seismic crews.

The desirability of transferring the intelligence of these old visual records to magnetic recording tape has been recognized and a great deal of effort to accomplish this end has been made. Thus, it has been reasoned that, if a reflection of a "pick" could be transferred to magnetic tape from an original graphic seismogram, the transfer would not only allow dynamic and static corrections to be made on playback of the magnetic tape, but would also permit the many other advantages of analysis by electrical systems to be utilized.

We have now found a method for the reproduction of graphic, i.e., visual, seismic records on magnetic tape. In our method, a seismogram having a trace marked thereon which denotes the locations of significant seismic information by amplitude variations of the trace along a base line representing time is reproduced by drawing a magnetized stylus, i.e., any instrument having a point from which a magnetic field emanates, transversely across a sheet of magnetic recording medium, i.e., magnetic tape, at points along the anticipated path on the tape of the magnetic pick-up head of the playback device. These points correspond in position along such path to the locations of significant seismic information along the time base line of the seismogram and the movement of the stylus thus produces variations in the magnetic orientation of the tape which are reproduced as electric signals by the pick-up on playback.

For a better understanding of the method of the present invention, reference should be had to the following drawings in which:

FIGURE 1 is an isometric view of the operation of the method of the invention;

FIGURE 2 is a partial vertical section of a magnetic tracing stylus used in the method of the invention; and, FIGURE 3 is an isometric view of a modification of the invention showing the use of a pantograph.

FIGURE 1 shows a wiggle trace seismogram 10 mounted on spools 10a and 10b. Under seismogram 10, a magnetic recording tape is mounted on spools 11a and 11b. Spools 10b and 11b are rotatable on their respective central axes by drive means 12 and, thereby, seismogram 10 and tape 11 are transportable from spools 10a and 11a, respectively, to spools 10b and 11b, respectively. FIGURE 1 also shows magnetic tracing stylus 13 resting on the upper surface of seismogram 10 at a timing line 13a thereon. In operation, magnetic stylus 13 moves transversely across the seismogram 10 and the wiggle traces thereon and produces variations in the magnetic orientation of tape 11 positioned beneath the seismogram 10 at points along tape 11 corresponding to points along the wiggle traces on seismogram 10.

Thus, in using one embodiment of our method, the interpreter of the seismic data clears the old seismogram of previous markings such as pencilled in "picks," timing lines and the like and places a strip of magnetic recording tape under or in back of such visual record. Either the record or the tape or both can be arranged for movement, as by being wound on reels for transport from a supply drum to a take-up drum, so long as a sufficient proximity or contact is maintained between the sheet and the tape to permit the interpreter to trace the seismic data of the graphic record on the magnetic tape using a magnetic stylus. Then, the interpreter draws the magnetic stylus across the wiggle trace record to mark cap break, up hole, computed reference for timing lines, and one second timing lines on the tape. Thereafter, keeping the front edge of the stylus at the timing line desired, the interpreter draws the magnetic stylus across the wiggle trace at each reflection. An intensity control for the magnetic field at the stylus point can be used for grading. Alternatively, a rectangular point on a permanent magnet stylus can be turned to give a broader magnetic field on the tape to differentiate between reliable and unreliable reflections.

FIGURE 2 shows a cross-section of the point of magnetic stylus 13 in which magnet 15 is held in an axially positioned bore in stylus 13.

FIGURE 3 shows the use of a pantographic device in the method of our invention. Two fixed pivots 20 and 21 hold the device in place and rod 22 connects them. Rod 22 is provided with holes or slots along its length. A similarly holed or slotted rod 23 is pivotally connected to rod 22 by a peg 26 resting in a pair of aligned holes or slots in rods 22 and 23. A tracing instrument 28 is connected to the end of rod 23 and can be moved transversely across the graphic seismic record, i.e., seismogram, 10. Also rotatably connected to the end of rod 23 is a third holed or slotted rod 25 which is pivotally connected to a fourth holed or slotted rod 24 by peg 27. Rod 25, therefore, transmits any movement of tracing instrument 28 and rod 23 to rod 24 and to magnetic stylus 13 at the end of rod 24. Magnetic stylus 13 thereupon moves transversely across magnetic tape 11 mounted on spools 11a and 11b for movement by motor means 12. The extent of such movement of magnetic stylus 13 and, therefore, the kind of variations produced in the magnetic orientation of tape 11 by stylus 13 are, of course, dependent upon the positions of pegs 26 and 27 along rods 22, 23, 24 and 25, respectively. Thus, the positioning of peg 26 along rod 22 and peg 27 along rod 25 determines what part of seismogram 10 is to be recorded on magnetic tape 11 and where thereon. Similarly, the positioning of peg 26 along rod 23 determines how much of seismogram 10 tracing instrument 28 can transverse: the closer peg 26 is positioned to tracing instrument 28, the shorter the arc the latter can move. By the same token, the positioning of peg 27 along rod 24 determines the degree of movement of magnetic stylus 13 on magnetic tape 11: the closer peg 27 is positioned to magnetic stylus 13, the shorter the arc the latter can move. And, therefore, in the event that seismogram 10 is considerably larger than magnetic tape 11 and the distances tracing instrument 28 must travel are considerably larger than those magnetic stylus 13 must travel, peg 26 cannot be positioned near tracing instrument 28 along rod 23, while peg 27 must be positioned close to magnetic stylus 13 on rod 24 to achieve the necessary compression or de-magnification of the seismic record.

Since the conventional wiggle trace seismograms are larger than the conventional magnetic tapes, the magnetic tape produced by the above techniques can be larger than those conventionally employed. However, by employing a special playback transport, the tape can be re-recorded to a tape of conventional size. Timing lines are first properly placed on conventional tape. By observing the one second timing lines, i.e., "picks," marked on the original tape on an oscilloscope and varying the speed of the special playback transport until the timing line speed of the original tape coincides with that of the conventional tape, the speeds of the two tapes can be synchronized in respect of time. Then, the conventional tape can easily be recorded with the information originally marked with the stylus on the original, oversize tape. Thereafter, the recorded conventional tape can be used to make a corrected record cross-section which, since background noise has been eliminated can be the same as a computed unmigrated time section.

But, on the other hand, if the magnetic tape transport on the magnetic playback system does not have variable speed and trace spacing, an alternate method is to change scales while transferring the "picks" from the wiggle trace seismic record to the magnetic tape in order to produce a magnetic tape on which the "picks" made by the stylus fall properly in the paths of the pick-up heads of the playback transport and having the proper spacing in time. To do this, an independent horizontal reduction or enlargement and an independent vertical reduction or enlargement are need to allow records of various widths and cranking speeds to be transferred to tapes where they have uniform horizontal and vertical dimensions. The Homolog Drawing Instrument, manufactured by H. H. Fenn (Engineers) Limited, 2a Charles Place, Easton, London, England, performs this operation when a magnetic head and tape are used on the read out of the instrument. Other servo-motor instruments or a pantographic device such as is shown in FIGURE 3 can also be employed.

The advantages of our new method are manifest. Since the interpreter does not have to time "picks," he can mark many more records and "pick" many partial reflections that would otherwise be lost to his final interpretation. Further, it eliminates the need for a computor for cross-sectioning records. Also fast migration can be accomplished from the cross-section. Finally, the system can be used with conventional playback equipment.

What we claim is:

A method for reproducing a seismogram having a trace marked thereon, the trace denoting points of significant seismic information by amplitude variations of the trace along a time base line, which method includes positioning a sheet of magnetic recording medium, having a path along which a magnetic pick-up head of a play back device is moved, relative to said seismogram such that said path and said base line are in a predetermined relationship, locating a point of significant seismic information on said seismogram and directing transversely across said path, an instrument having a magnetic field emanating from a point, said directing being accomplished, at the point along said path corresponding to the location of said point of significant seismic information along said time base line, thereby producing at said point along said path a variation in magnetic orientation transversely across said sheet of magnetic recording medium.

References Cited by the Examiner

UNITED STATES PATENTS

| | | | |
|---|---|---|---|
| 1,681,628 | 8/28 | Schwarzkopf. | |
| 1,941,036 | 12/33 | Lenk | 179—100.2 |
| 2,294,149 | 8/42 | Kline et al. | 346—74 |
| 2,442,098 | 5/48 | Shewell et al. | |
| 2,511,121 | 6/50 | Murphy | 346—74 |
| 2,917,588 | 12/59 | White | 346—74 |
| 2,928,070 | 3/60 | Palmer | 346—74 |
| 2,943,908 | 7/60 | Hanna | 346—74 |
| 2,996,575 | 8/61 | Sims | 346—74 |

FOREIGN PATENTS 1,181,561 1/59 France.

OTHER REFERENCES

G.E. Review, 7/52, pages 20–21.

IRVING L. SRAGOW, *Primary Examiner.*

L. MILLER ANDRUS, NEWTON N. LOVEWELL,
*Examiners.*